No. 629,528. Patented July 25, 1899.
A. SILKMAN & H. SEXTON.
TIRE FOR BICYCLES OR SIMILAR VEHICLES.
(Application filed Aug. 29, 1898.)
(No Model.)
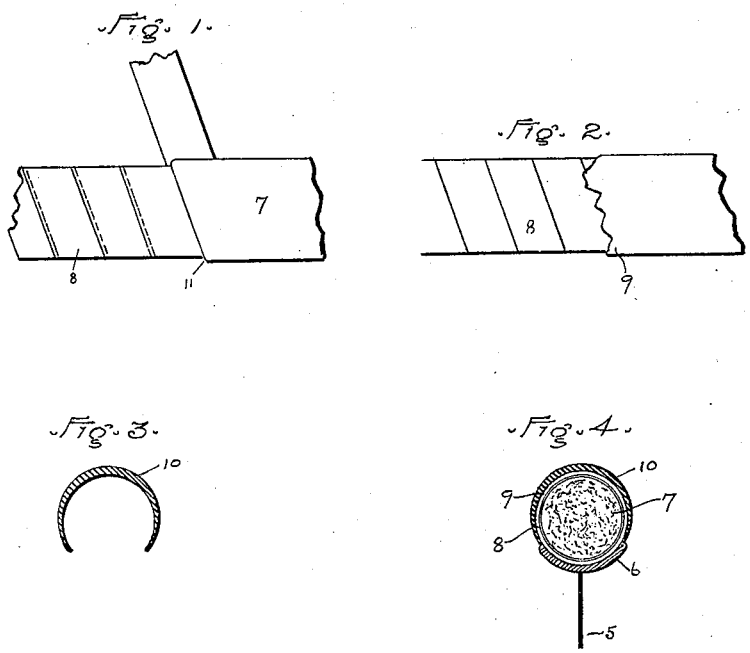
Witnesses
Gaston L. Villere
J. M. Barrett
Aaron Silkman
Harry Sexton
Inventors
By their Attorney Garry P. Van Wye

UNITED STATES PATENT OFFICE.

AARON SILKMAN AND HARRY SEXTON, OF NEW YORK, N. Y.

TIRE FOR BICYCLES OR SIMILAR VEHICLES.

SPECIFICATION forming part of Letters Patent No. 629,528, dated July 25, 1899.

Application filed August 29, 1898. Serial No. 689,791. (No model.)

*To all whom it may concern:*

Be it known that we, AARON SILKMAN and HARRY SEXTON, of the city, county, and State of New York, have invented a new and useful Tire for Bicycles or Similar Vehicles, of which the following is a specification.

This invention relates to tires for bicycles and similar vehicles and to the method of producing the same, and has for its object to produce a tire of the class which is filled with a resilient packing in a cheap and efficient manner.

The invention is fully disclosed in the following specification, of which the accompanying drawings form a part, in which—

Figure 1 represents a section of a tire constructed according to our invention with the rubber seal omitted. Fig. 2 is a view similar to Fig. 1 with the rubber seal in place. Fig. 3 is a cross-section of a tire-shield which we use on the tread side of the tire, and Fig. 4 is a transverse section of the tire and shield mounted on the rim of a wheel.

Similar numerals refer to similar parts in each of the views, and in the practice of our invention we provide a strip of felt 7, which may be of any desired shape in cross-section and which is preferably larger in cross-section than the completed tire, and around the felt 7 we wind spirally a strip of rubber or similar material 8, the said strip 8 being wound so tightly that the felt is compressed, as shown at 11. When the spiral winding is completed, the tire is dipped into a vat of rubber solution, a portion of which will adhere to the separate spirals, securely binding the same together and also forming the outer surface of the tire, as shown at 9. We also provide a rubber shield 10, which is crescent-shaped in cross-section and so proportioned in size that when mounted on the rim 6 of a bicycle-wheel, one spoke of which is shown at 5, the said shield will extend around the said tire and the sides thereof will meet the sides of the rim, to which they may be secured in any desired manner.

It will thus be seen that we provide a tire in a very simple and efficient manner and at a comparatively small cost, and we do not wish to limit ourselves to the kind of material used with the exception of the rubber seal and the process of applying the same.

Having fully described our invention, we claim as new and desire to secure by Letters Patent—

As an improved article of manufacture, a tire for bicycles and similar vehicles comprising a strip of felt; a strip of elastic material spirally wound thereon whereby the said felt is compressed to secure the desired degree of elasticity, and an adhesive rubber seal forming the outer surface of the tire and binding the separate spirals together, substantially as and for the purpose described.

In testimony that we claim the above as our invention we have hereto affixed our signatures in the presence of two subscribing witnesses.

AARON SILKMAN.
   HARRY SEXTON.

Witnesses:
 W. H. LIPPINCOTT,
 G. B. McKOWEN.